United States Patent
Suchecki, Jr. et al.

(10) Patent No.: US 6,309,551 B1
(45) Date of Patent: Oct. 30, 2001

(54) SOLUTION TREATMENT AGENT SUPPLY APPARATUS

(75) Inventors: Ronald J. Suchecki, Jr., China Spring; Donald L. Brown, Flint, both of TX (US)

(73) Assignee: Hoot Aerobic Systems, Inc., Lake Charles, LA (US)

( * ) Notice: Subject to any disclaimer, the term of this patent is extended or adjusted under 35 U.S.C. 154(b) by 0 days.

(21) Appl. No.: 09/573,468

(22) Filed: May 17, 2000

Related U.S. Application Data (63) Continuation-in-part of application No. 09/395,641, filed on Sep. 14, 1999, now Pat. No. 6,183,631.

(51) Int. Cl.⁷ .................................................. B01D 17/12
(52) U.S. Cl. ...................... 210/744; 73/290 R; 137/268; 210/86; 210/169; 210/198.1; 340/612
(58) Field of Search ................................. 210/85, 86, 91, 210/138, 87, 100, 169, 198.1, 206, 739, 744, 754, 756, 764; 422/261–266, 277, 278; 340/612; 73/290 R; 137/268, 261; 239/193, 310

(56) References Cited

U.S. PATENT DOCUMENTS

| | | |
|---|---|---|
| 3,022,247 | 2/1962 | Selby et al. . |
| 3,081,472 | 3/1963 | Van Dijk . |
| 3,595,786 | 7/1971 | Horvath et al. . |
| 3,655,050 | 4/1972 | Fifer . |
| 3,680,736 | 8/1972 | Viessmann . |
| 4,132,243 | 1/1979 | Kuus . |
| 4,199,001 | 4/1980 | Kratz . |
| 4,250,911 | 2/1981 | Kratz . |
| 4,759,907 | 7/1988 | Kawolics et al. . |
| 4,830,757 | 5/1989 | Lynch et al. . |
| 4,986,902 | 1/1991 | Serna . |
| 5,064,531 | 11/1991 | Wang et al. . |
| 5,076,315 | 12/1991 | King . |
| 5,107,892 | 4/1992 | Plachy . |
| 5,132,669 * | 7/1992 | Jackson ................................ 340/612 |
| 5,297,428 | 3/1994 | Carr et al. . |
| 5,405,540 | 4/1995 | Tang . |
| 5,427,694 | 6/1995 | Rugg . |
| 5,680,989 | 10/1997 | Plachy et al. . |
| 5,871,639 * | 2/1999 | Hsu ........................................ 210/87 |
| 5,885,446 | 3/1999 | McGrew . |
| 5,932,093 | 8/1999 | Chulick . |
| 6,066,252 * | 5/2000 | Reeves .................................... 210/86 |
| 6,183,631 * | 2/2001 | Cormier et al. ....................... 210/91 |

* cited by examiner

Primary Examiner—Joseph W. Drodge
(74) Attorney, Agent, or Firm—William A. Bonk, III; Dykema Gossett PLLC (57) ABSTRACT

An apparatus for associating a solution at an infinitely-variable level and/or flow rate with respect to an agent including an agent amount indicator that promotes agent-solution association adaptable for use in a chlorinator, or comparable component, of a fluid treatment plant. An embodiment configured according to the invention includes a chamber with an inlet and a vertically-inferior outlet. The level and flow of fluid in the chamber is regulated by a weir mounted on the outlet. Fluid in the chamber passes through an agent the retainer maintained in the chamber and washes over the agent, dissolving and depleting the agent. A magnetic follower on top of the agent urges the agent toward the bottom of the retainer. As the agent becomes depleted, the follower approaches the bottom of the retainer until it attains a predetermined distance from a sensor which activates a low-agent-supply alarm. If the alarm remains activated for a predetermined amount of time, a second alarm is activated.

8 Claims, 5 Drawing Sheets

SOLUTION TREATMENT AGENT SUPPLY APPARATUS

REFERENCE TO EARLIER APPLICATION

This Application is a continuation in part of U.S. patent application Ser. No. 09/395,641, filed Sep. 14, 1999, by Murphy Cormier et al., now U.S. Pat. No. 6,183,631 entitled Solution Treatment Agent Supply Apparatus.

BACKGROUND OF THE INVENTION

1. Field of the Invention

The invention relates to waste water treatment. Specifically, the invention relates to ensuring that a proper amount of an agent is associated with water and waste water during treatment.

2. Discussion of Related Art

Water and wastewater treatment processes typically introduce into an aqueous solution to be treated a disinfectant or biocidal agent, such as bromine or chlorine. Chlorine perhaps is the most common water and wastewater agent used throughout the world, today. Large wastewater treatment plants commonly use chlorine gas or liquid. Small plants, such as home wastewater treatment plants and some commercial wastewater treatment plants use chlorine tablets, composed of mainly calcium hypochlorite.

A variety of techniques are known or used for introducing these and other agents into an aqueous solution. Some treatment processes involve manually adding a liquid or granular agent to the solution. A drawback to this method is exposing the person handling the agent to potentially hazardous chemicals. Another drawback is the deterioration of the activeness of the agent when exposed to ambient conditions, such as humidity.

Some processes employ an agent distributor, such as a dissolve- or erosion-type flow-through feeder. Dissolve/erosion-type feeders typically introduce low-solubility agents into aqueous systems. Generally, dissolve/erosion feeders operate by establishing a flow of solution through the feeder to cause surface friction between the solution and the agent granules or tablets, thereby eroding the surfaces thereof and dissolving the displaced particles. See, for example, U.S. Pat. No. 5,405,540, issued Apr. 11, 1995, to N. Tang. Some apparatuses and processes monitor the amount of agent dispensed. See, for example, U.S. Pat. No. 5,064,531, issued Nov. 12, 1991, to L. K. Wang et al. However, a significant drawback of these dissolve/erosion-type feeders is, because granule/tablet dissolution rate is dependent on solution temperature and flow rate, inter alia, the difficulty in predicting agent quantity requirements.

To better control the amount of agent dispensed, an agent feeder has been positioned in a container in which solution level and flow rate therethrough are controlled. However, the mechanisms for doing so do not lend to critical, incremental adjustments. See, for example, U.S. Pat. No. 3,595,786, issued Jul. 27, 1971, to R. J. Horvath et al. and U.S. Pat. No. 4,759,907, issued Jul. 26, 1988, to R. J. Kawolics et al.

Some devices indicate agent level. See, for example, U.S. Pat. No. 4,986,902, issued Jan. 22, 1991, to P. Sema. Other devices and methods only indicate low or depleted agent supply. See, for example, U.S. Pat. No. 3,680,736, issued Aug. 1, 1972, to H. Viesmann and U.S. Pat. No. 5,076,315, issued Dec. 31, 1991, to J. A. King. Still other devices measure and report agent amount for monitoring purposes. See, for example, U.S. Pat. No. 4,830,757, issued May 16, 1989, to J. T. Lynch et al. and U.S. Pat. No. 5,427,694, issued Jun. 27, 1995, to L. E. Rugg.

Some devices include an alarm that is activated when an agent is depleted or attains a low level. See, for example, U.S. Pat. No. 3,655,050, issued Apr. 11, 1972, to R. L. Fifer. Some alarm devices even exploit magnetic phenomena. See, for example, U.S. Pat. No. 5,297,428, issued Mar. 29, 1994, to L. L. Carr et al.

Unfortunately, none of the foregoing provides for associating a solution at an infinitely-variable level and/or flow rate with respect to an agent or an agent amount indicator that also promotes agent-solution association. None of the aforementioned references, taken alone or in combination, are seen as teaching or suggesting the presently claimed Solution Treatment Agent Supply Apparatus.

SUMMARY OF THE INVENTION

The invention is an apparatus for associating a solution at an infinitely-variable level and/or flow rate with respect to an agent. The invention also provides an agent amount indicator that promotes agent-solution association. The invention improves on septic systems commonly used in communities in which houses are not connected to centralized sewage systems. The invention provides for more completely reducing waste received in these septic systems before voidance into the environment. As a result, the soil surrounding a septic tank incorporating features of the invention, or leach field, is less contaminated and presents less of a biological hazard to local inhabitants. Since the surrounding soil is less contaminated, fewer contaminates percolate into the water table from which local inhabitants draw drinking water. The invention also promotes cleaner, more healthful air, since fewer contaminants that may become airborne from the soil, carrying sickness or at least foul odors to the inhabitants, are exposed to the air. The invention provides improved elements and arrangements thereof, in an apparatus for the purposes described which are inexpensive, dependable and effective in accomplishing its intended purposes.

The invention is adaptable for use in a chlorinator, or comparable component, of a fluid treatment plant. The invention also is adaptable for use with drinking fountains, or any fluid system that includes associating an agent with fluid to be treated. An embodiment of an agent supplier configured according to the invention includes a chamber with an inlet and a vertically-inferior outlet. The level of fluid in the chamber and flow therethrough is regulated by a weir mounted on the outlet. A flow-through agent retainer containing agent tablets is received through the top of and rests on the floor of the chamber. Fluid in the chamber passes through the retainer and washes over the agent, dissolving and depleting the agent. A magnetic follower on top of the agent urges the agent toward the bottom of the retainer. As the agent becomes depleted, the follower approaches the bottom of the retainer. When the follower attains a predetermined distance from a sensor, the sensor activates a low-agent-supply alarm.

These and other features of the invention will be appreciated more readily in view of the drawings and detailed description below.

BRIEF DESCRIPTION OF THE DRAWINGS

The invention is described in detail below with reference to the following drawings, throughout which similar reference characters denote corresponding features consistently, wherein.

DETAILED DESCRIPTION OF THE INVENTION

The invention is an apparatus for associating a solution at an infinitely-variable level and/or flow rate with respect to an agent. An embodiment of an agent supplier configured according to the invention includes a chamber with an inlet and a vertically-inferior outlet. An adjustable weir on the outlet regulates fluid level and flow through the chamber in association with agent tablets that are biased toward the bottom of the tank.

Figure 1:
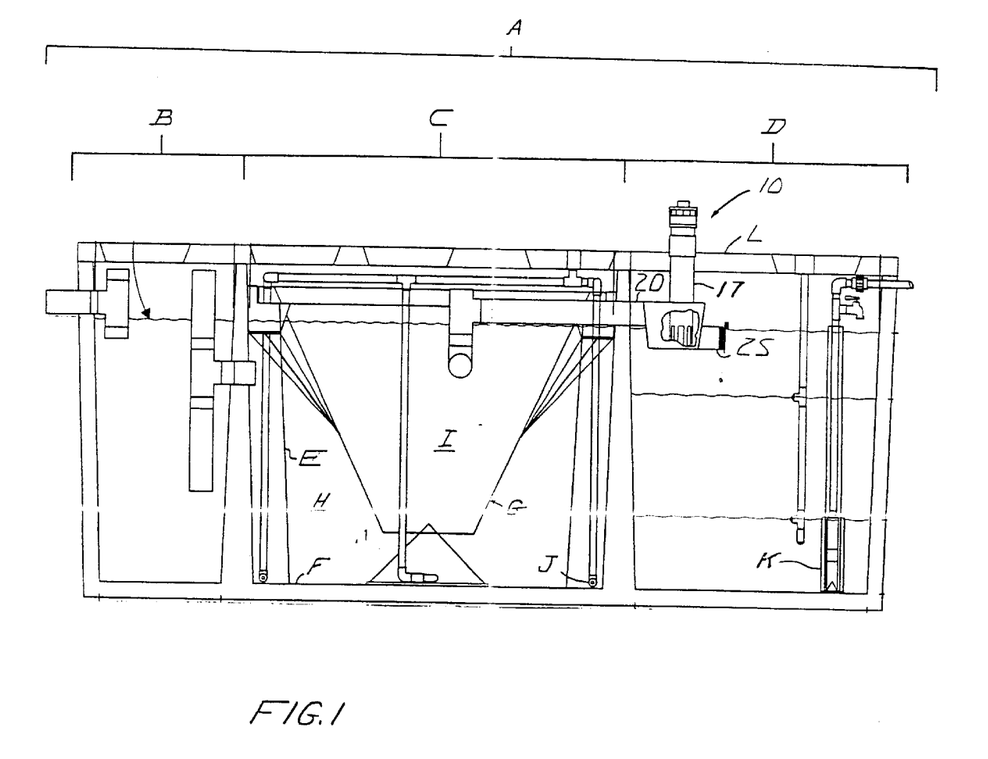
FIG. 1 is a vertical cross-sectional detail view of an embodiment of a waste water treatment tank including an agent supplier constructed according to principles of the invention.

Referring to FIG. 1, the present agent supplier 10 is shown incorporated in a conventional waste water treatment plant A. The treatment plant A includes a pre-treatment tank B, a treatment tank C and a holding tank D. Untreated solution flows into the pre-treatment tank B, into and through the treatment tank C, into and through the agent supplier 10, into and through the holding tank D, then is voided into the environment.

The pre-treatment tank B is where inflowing fluids enter the aerobic system. The pre-treatment tank B receives raw, untreated sewage, which is allowed to settle. The pre-treatment tank B also retains any non-biodegradables inadvertently introduced into the system, such as rags and plastic, which settle out prior to introduction of the fluid into the treatment tank. Some aerobic decomposition of the effluent also begins in the pre-treatment tank B.

The treatment tank C is where the bulk of the aerobic decomposition of the effluent occurs. The treatment tank C includes walls E and a floor F. A hopper G mounted in the tank C cooperates with the walls E and floor F to define aerator zones H and an interior clarifier chamber I. Diffusers J in the treatment tank C promote flow in the aerator zones H which enhances the oxygen content of the solution in the tank C and breakdown of solid matter in the solution. In the aerator zones H, sewage aeration thoroughly mixes the organic materials of the sewage with the bacterial population, so that bacteria attacks and reduces the organic materials. Aerated and reduced solution from the aeration zones H passes into the clarifier chamber I. The throat-like lower aperture of the hopper G minimizes fluid flow within the clarifier chamber I, thus encourages the settling out of particulate matter in the clarifier chamber I back into the aerator zones H for additional breakdown.

Rather than passing effluent from the clarifier chamber I into the holding tank D, the invention provides for additional treatment of the effluent from the clarifier chamber I. The additional treatment kills any remaining bacteria which may pose a health risk to humans and animals nearby where treated solution is pumped out of the holding tank D. Solution from the clarifier chamber I passes into the agent supplier 10 where the solution is associated with a biocidal agent, such as chlorine.

The holding tank D receives treated fluid from the agent supplier 10 where it remains for a period of time. Any remaining particulate matter settles out prior to being pumped by a pump K out of the system into the environment.

Figures 2, 3:
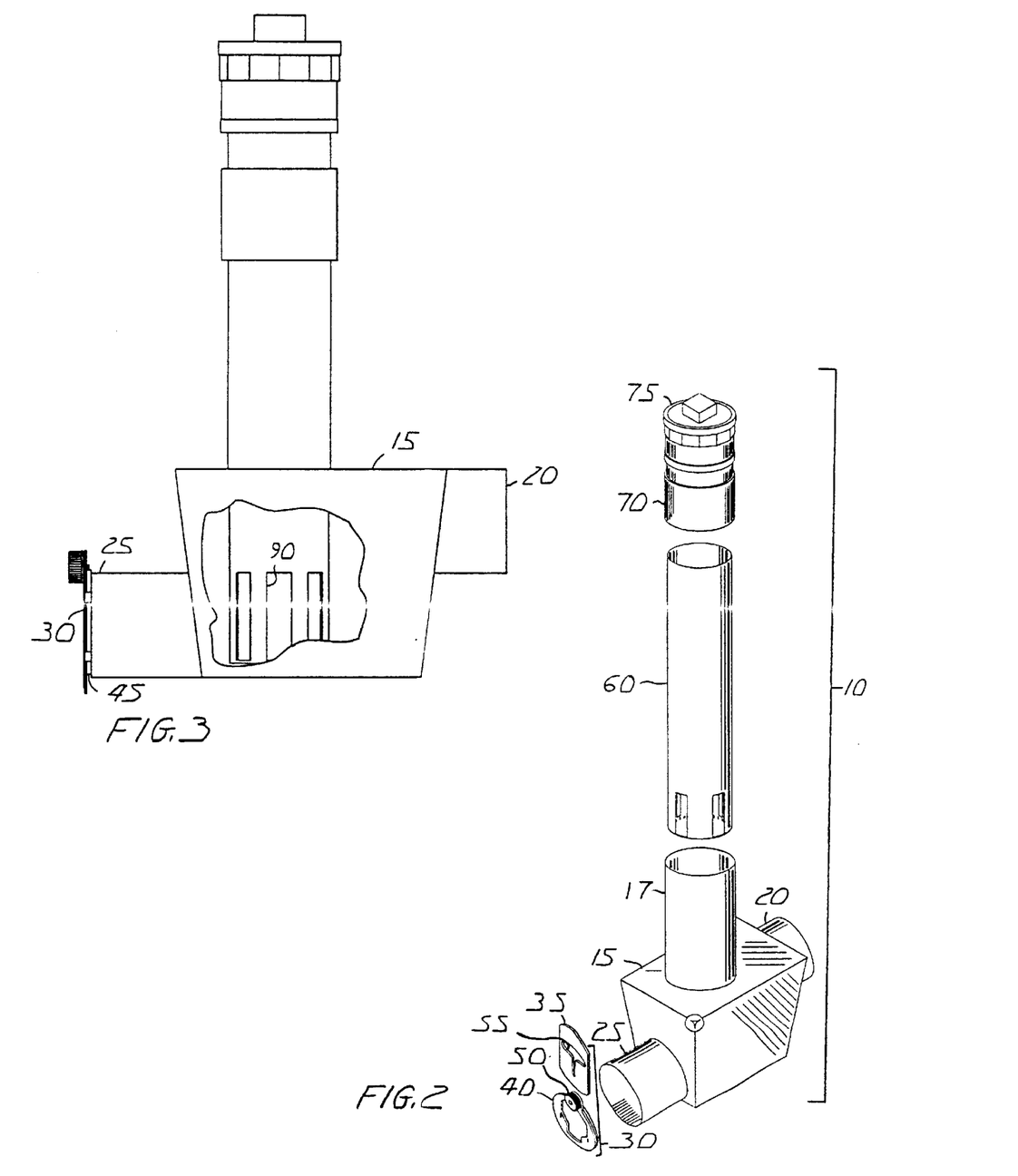
FIG. 2 is a top front right side elevational view of an embodiment of an agent supplier constructed according to principles of the invention.
FIG. 3 is right side elevational view of the embodiment of FIG. 2.

Referring also to FIGS. 2 and 3, the agent supplier 10 includes a chamber 15 which may be constructed from plastic or fiberglass or any other suitable material. In the application shown in FIG. 1, the chamber 15 has a sleeve 17 for suspending the agent supplier 10, in this case from the cover L of the holding tank D. Other suitable mechanisms may be employed for positioning the agent supplier 10 in the holding tank D, or other appropriate location, or as required for different applications.

The chamber 15 has an inlet 20 and an outlet 25. The inlet 20 is vertically superior to the outlet 25 to encourage flow from the clarifier chamber I through the chamber 15 and out the outlet 25 into the holding tank D. It is not desirable to have fluid from the chamber 15 flow back through the inlet 20 into the clarifier chamber I because such fluid has come into contact with a biocidal agent. If this biocidal agent were introduced into clarifier chamber I, necessary bacteria for breaking down solids in the aerator zones H in the treatment tank C would be hindered, if not eliminated.

Figure 4:
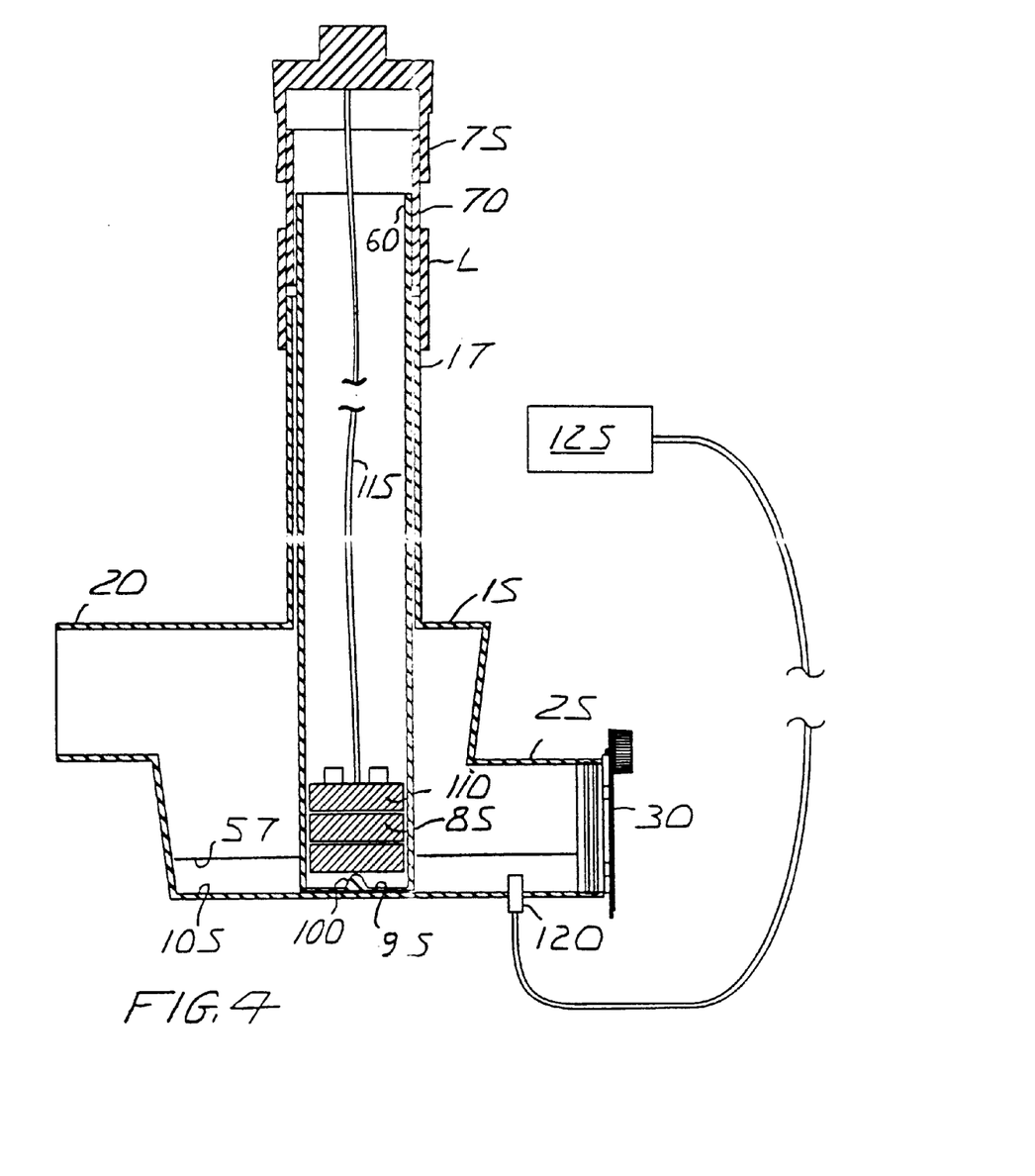
FIG. 4 is a vertical cross-sectional detail view of the embodiment of FIG. 2.
Figure 5:
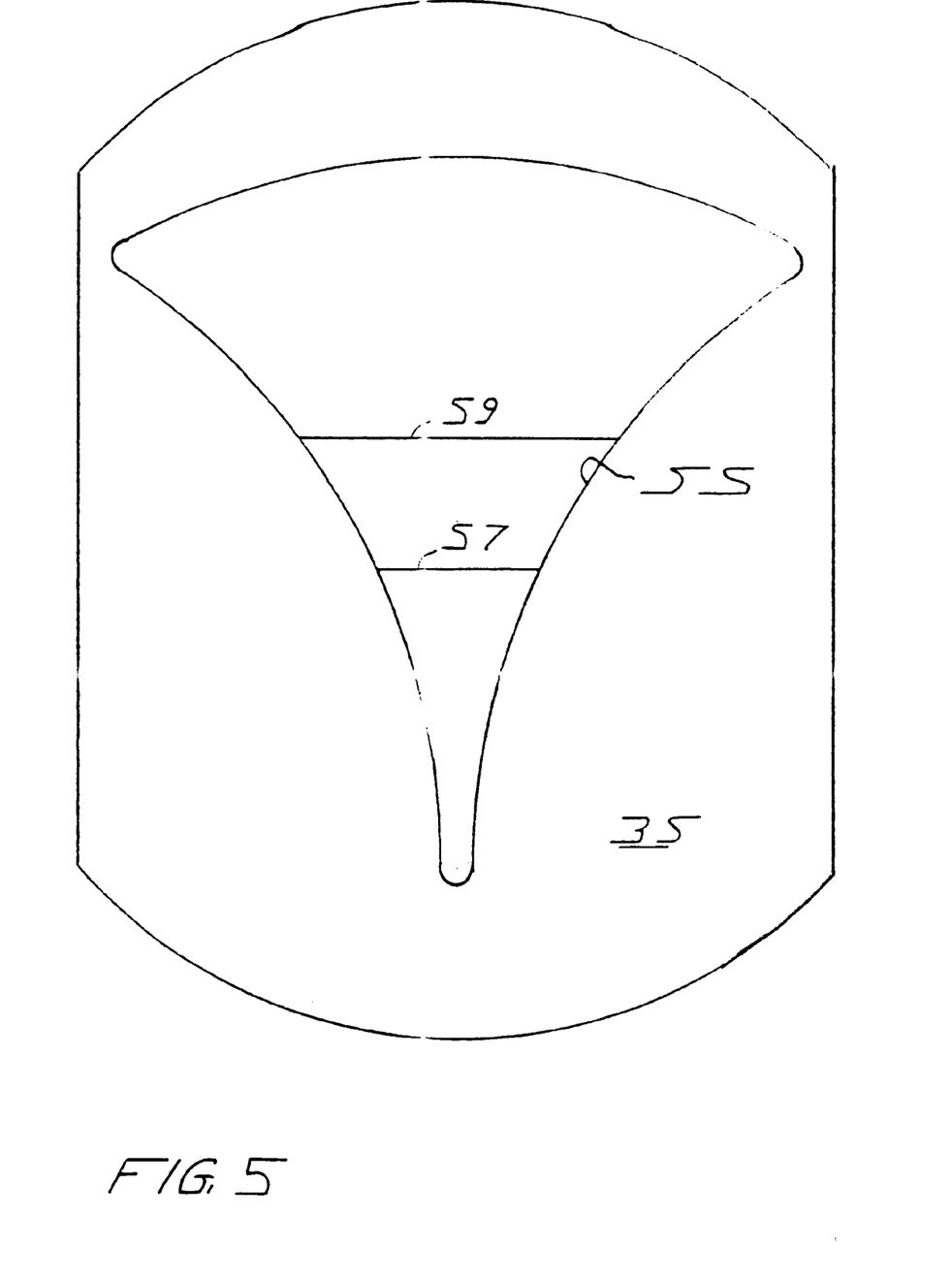
FIG. 5 is a right side elevational view of a weir plate of the embodiment of FIG. 2.

Referring to FIGS. 1 and 4, the agent supplier 10 includes an agent retainer 60 which, in the application shown in FIG. 1, is received in the sleeve 17, and extends into the chamber 15. A collar 70 extends from the cover L and may receive the agent retainer 60 in the same fashion as the sleeve 17. A cap assembly 75 selectively closes the collar 70, discouraging entry of dirt and so forth, yet affording access to the agent retainer 60 for supplying agent thereto.

The agent retainer 60 receives agent 85, preferably in the form of a plurality of tablets. As mentioned above, the agent preferably is chlorine, but may be any compound suitable for an Application for which the invention is adapted. The agent retainer 60 is configured to receive the agent 85 in a manner that maintains the agent 85 in an orderly fashion for controlled introduction into the chamber 15, as described below. In the case where the agent 85 is in tablet form, for example, the agent retainer 60 should be configured to receive agent tablets in a stack for serial advancement through the agent retainer 60, as shown.

As shown in FIG. 3, the agent retainer 60 has slots 90. Preferably, the slots 90 are radially diverged and axially aligned with respect to the agent retainer 60. As shown in FIG. 4, the agent retainer 60 also has one or more grate(s) or screen(s) 95. The screen(s) 95, preferably, define(s) the bottom of the agent retainer 60. The configuration, number and location of the slots 90 and screens 85 provide for optimal association between the solution and agent in the agent retainer 60.

The agent retainer 60 has a punt 100 extending from the screen 95 or bottom thereof. The punt 100 maintains the agent 85, in this case the tablets, above the bottom or screen 95 of the agent retainer 60 and the floor 105 of the chamber 15. The punt 100 elevates the agent 85 in the agent retainer 60 so that the agent 85 is not totally immersed in solution. Especially in the case where the agent 85 is in the form of tablets, avoiding total immersion of the tablet-form agent 85 helps to preserve the integrity of the tablet, slowing tablet degradation and affording the operator more control over the amount of agent desired to be associated with the solution. The punt 100 also elevates the agent 85 so as to expose the lower surface of the agent 85, thus promoting depletion from the bottom; allowing the agent 85 to settle increases the potential for the agent 85 to fuse with the floor 105, less available for associating with the solution. Elevating the agent 85 within the agent retainer 60 also reduces the potential for the agent 85 to partially dissolve and clog passages through the screen 95.

Referring also to FIG. 1, in one application of the invention, solution flows from the clarifier chamber I through the chamber 15, through the slots 80 and screen 95 of the agent retainer 60, then out the outlet 25 into the holding tank D. The amount of agent 85 associated with and introduced into the solution depends on the level 57 and flow of the solution in the chamber 15, hence with respect to the agent retainer 60. Controlling the amount of agent supplied is important from cost and health standpoints. If too much agent is supplied to the solution, agent is wasted, thus increasing the operating costs of solution treatment. Too much agent introduced into the treated solution ultimately voided into the environment also may have a toxic effect on the indigenous plants and animals. On the other hand, if too little agent is supplied to the solution, treated solution ultimately voided into the environment may contain an unacceptable level of bacteria or other pathogens that may harm the indigenous plants and animals.

Referring again to FIG. 2, to control solution level and flow rate in the chamber 15, flow through the outlet 25 is regulated by a weir 30. The weir 30, described in U.S. Pat. No. 5,680,989, is adjustable, thus provides for adjusting the level of fluid 57 inside the chamber 15 as well as the flow therethrough. Referring also to FIG. 5, a slideable weir plate 35 is sandwiched between a support plate 40 and a plug body 45, shown in FIG. 3. Once assembled, as shown in FIG. 3, an adjustment knob 50 may be rotated to translate the weir plate 35 vertically up and down relative to the support plate 40. Translating the weir plate 35 changes the position of the weir opening 55 relative to the outlet 25. Changing the position of the weir opening 55 also changes the position of the weir opening 55 relative to the bottom 105 of the chamber 15, which impacts the solution level in the chamber 15. For example, raising the weir opening 55 relative to the bottom 105 of the chamber 15 causes more solution to collect in the chamber 15 before reaching the opening 55.

As mentioned in U.S. Pat. No. 5,680,989, the shape of the weir opening 55 is configured to maintain substantially constant flow through the chamber 15, regardless of the solution level 57 in the chamber 15. Maintaining substantially constant flow through the chamber 15 occurs because of the vertically-expanding configuration of the weir opening 55. As the solution level rises relative to the weir opening 55, the effective passage increases, allowing greater flow therethrough. Higher solution levels generally are accompanied by a corresponding volume increase before the weir 30. In order to maintain steady flow through the chamber 15, a greater volume of fluid must pass through the weir 30. To do so, the weir opening 55 provides a wider passage at higher fluid levels, such as at fluid level 59.

Referring again to FIG. 4, a follower 110 sits on top of the agent 85. The follower 110 has a mass that, under the influence of gravity, imparts sufficient force to advance the agent 85 through the agent retainer 60. Forcefully advancing the agent 85 through the agent retainer 60 often is required due to expansion of the agent from absorption of moisture in the agent retainer 60. Thus, the mass of the follower 110 depends on factors, such as agent integrity and the impact the operating environment of the agent supplier on agent integrity and expansion. The configuration of the follower 110, preferably, corresponds to the configuration of the agent 85. For example, where the agent 85 is in tablet form, the follower 110 assumes the configuration of an agent tablet.

To introduce agent into the agent retainer 60, the follower 110 first must be removed from the agent retainer. To prevent losing the follower 110, a cord 115 may connect the follower 110 to the cap assembly 75.

An important consideration to solution treatment systems, particularly septic and drinking water systems, is the assurance that the system contains a sufficient amount of agent to treat the solution. If the agent retainer 60 contains an inadequate supply of agent 85, the solution is inadequately treated, as described above, which may lead to sickness and regulatory issues.

To address this concern, the invention provides for monitoring the amount of agent in the agent supplier 10. To that end, the agent supplier 10 includes a sensor 120 that is responsive to the relative location of the follower 115, thus the level of the agent 85 in the agent retainer 60. Accordingly, the follower 110 is constructed so that it influences the sensor 120 within a predetermined zone of influence. The zone of influence corresponds to an amount of agent 85 remaining in the agent retainer 60 which is anticipated to be sufficient to treat the solution for a sufficient amount of time that allows for agent replenishment. For example, where the agent is in tablet form, the zone of influence may define the boundary at which only 1½ tablets remain in the agent retainer 60. The sensor 120, shown mounted on the floor 105 of the chamber 15, may be mounted anywhere the sensor 120 optimally may sense when the follower 110 falls within the predetermined zone of influence in the agent retainer 60. Preferably, the follower 110 is magnetic and the sensor 115 is responsive to magnetic fields and/or fluctuations therein.

In operation, as agent 85 is depleted from association with the solution flowing through the chamber 15, the follower 110 urges the agent down through the agent retainer 60. As the agent advances down through the agent retainer 60, the follower 110 also advances through the agent retainer 60. When the follower 110 enters the zone of influence, the sensor 120 responds and activates a first alarm 125. The first alarm 125 may assume any form, such as a visual or audible signal. The first alarm 125 is configured to adequately warn the solution treatment system operator or maintenance personnel that the system requires replenishment. Triggering the first alarm 125 may or may not be accompanied by altering flow to, through or from the water treatment plant.

Referring to FIG. 6, another embodiment of the invention provides for actively notifying appropriate personnel that a critical level of agent exists in the agent supplier. To this end, the agent supplier 200 has a sensor 220 that is responsive to a follower (not shown) and functions much like the sensor 120 of the earlier embodiments. A controller 225 is responsive to the sensor 220. A relatively inexpensive and reliable mechanism for establishing communication between the sensor 220 and controller 225 includes conventional wiring 230 having appropriate insulation and waterproofing. Other communication conventions are considered within the scope of the invention.

The controller 225 may respond to the sensor 220 in any of a number of ways. For example, the controller 225 may initiate a second alarm (not shown) having a visual or audible signal. The controller 225 may initiate telephonic communication to warn a solution treatment system operator or maintenance personnel that the agent supplier requires replenishment. To this end, the controller 225 may be equipped with an appropriate modem (not shown) and facsimile, voice or global computer network-based telecommunication apparatuses. For example, the controller 225 may be connected to a conventional telephone network by a conventional carrier line 235 which also is connected to a telephone 240 associated with the solution treatment system operator or maintenance personnel.

Figure 6:
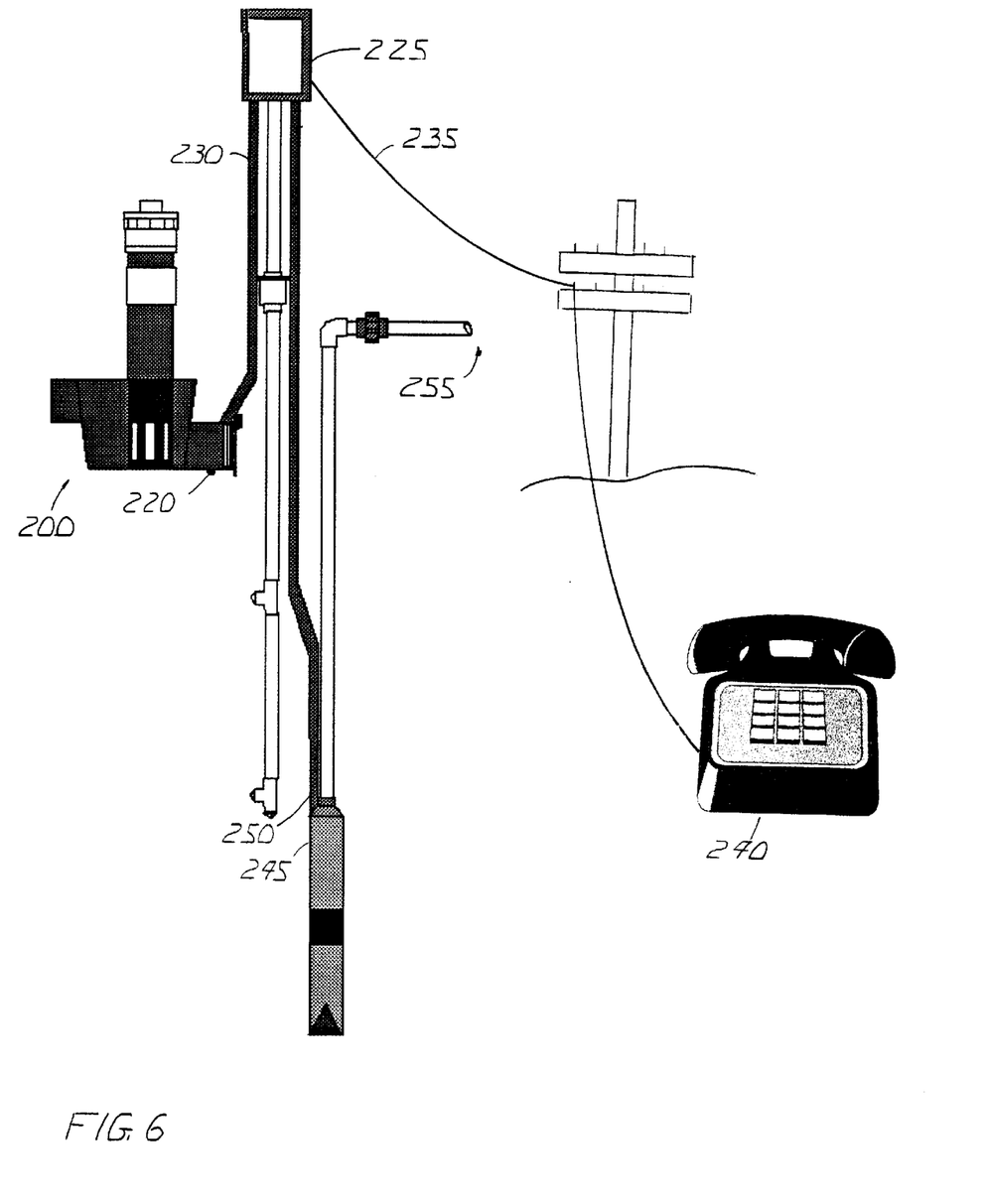
FIG. 6 is a right side elevational view of the embodiment of FIG. 2, a pump and a controller electrically connected therebetween.

Responsive to a critical level signal from the sensor 220, the controller 225 may initiate a telephone call to the telephone 240 and, upon connection, deliver a voice message that the agent supplier needs replenishment. Alternatively, the controller may send a facsimile message or log onto a global computer network and issue an appropriate email message to the same effect.

The invention also may be adapted for preventing delivery of insufficiently treated or disinfected effluent into the environment in the event the agent supplier is not replenished. In the interest of safety, or as mandated by various jurisdictions, the water treatment tank is prevented from delivering insufficiently treated or disinfected effluent to the environment when the solution being treated in the tank is insufficiently treated. To this end, the invention measures an amount of time that elapses from initiation of the first alarm 125 and/or second alarm, when the agent supply reaches a critical level. When a significant amount of time passes following first or second alarm initiation, the invention provides for terminating flow into, through or from the treatment tank. For example, the controller 225, connected to a pump 245 with conventional wiring 250 or other communication convention, may initiate a signal to, or otherwise influence, the pump 245 to stop. Alternatively, the controller 225 may initiate a signal to, or otherwise influence, a valve (not shown) regulating flow to or from the pump 245, the outlet 255 or inlet (not shown) to stop flow therethrough. Thus, rather than prohibiting flow from the treatment tank, the controller 225 may be configured to prohibit flow into the treatment tank.

Another embodiment of the invention provides for reducing or preventing production of effluent which an inadequately maintained treatment tank could not treat. To this end, rather than controlling the ingress or egress of fluid into or out of the treatment tank, the invention regulates fluid flowing into an establishment serviced by the treatment tank, the fluid used in the establishment being a potential source of effluent. For example, when a significant amount of time passes following first or second alarm initiation, as described above, the invention provides for terminating conventional water service to an establishment that employs a treatment tank. Stemming fluid into the establishment increases the likelihood that the critical level of agent in the agent supplier will be noticed and stimulate replenishment thereof. Prohibiting fluid into the building also is likely to decrease the production of effluent, such as from showers or toilet flushing, which would be routed to the treatment tank. To this end, the controller 225 may initiate a signal to or otherwise influence a pump (not shown) or valve (not shown) that ordinarily conveys water to the establishment to terminate same.

The invention is not limited to the foregoing, but encompasses all improvements and substitutions consistent with the principles of the invention.

We claim:

1. An agent supplier comprising:
    an agent retainer adapted to retain an agent;
    a follower adapted to contact the agent, a position of said follower corresponding to an amount of agent in said agent retainer;
    a sensor responsive to the position of said follower;
    a controller responsive to said sensor; and
    first and second alarms;
    wherein, when the position falls below a level, said controller is operable to activate the first alarm and, in response to the first alarm remaining activated for a predetermined amount of time, said controller is operable to activate the second alarm.

2. The agent supplier of claim 1, wherein the first alarm and the second alarm are each selected from a visual signal, an audible signal, a telephonic message, a facsimile message, a message transmitted via a global computer network and combinations thereof.

3. The agent supplier of claim 1, wherein, if the position remains below the level for performing an action selected from a second predetermined amount of time following when said controller activates the first alarm or the second alarm, said controller is operable to activate a system shutoff for performing an action selected from restricting flow into, through or from a treatment tank serviced by said agent supplier, restricting flow into an establishment serviced by the treatment tank or combinations thereof.

4. The agent supplier of claim 3, wherein said system shutoff is selected from a valve associated with a pump for pumping solution from the treatment tank, a valve for regulating flow into the treatment tank, a valve for regulating flow from the treatment tank, a pump for pumping fluid into the establishment, a valve for regulating flow into the establishment and combinations thereof.

5. A method for treating a solution in a treatment tank comprising:
    monitoring an amount of agent available for introduction into the solution;
    activating a first alarm if the amount falls below a level; and
    activating a second alarm in response to the first alarm remaining activated for an amount of time.

6. The method of claim 5, wherein the first alarm and the second alarm are each selected from a visual signal, an audible signal. a telephonic message, a fascimile message, a message transmitted via a global computer network and combinations thereof.

7. The method of claim 5, further comprising activating a system shutoff for performing an action selected from restricting flow into, through or from the treatment tank, restricting flow into an establishment serviced by the treatment tank or combinations thereof, if a second amount of time elapses following said activating the first alarm or the second alarm with the amount of time below the level.

8. The agent supplier of claim 7, wherein said system shutoff is selected from a valve associated with a pump for pumping solution from the treatment tank, a valve for regulating flow into the treatment tank, a valve for regulating flow from the treatment tank, a pump for pumping fluid into the establishment, a valve for regulating flow into the establishment and combinations thereof.

* * * * *

UNITED STATES PATENT AND TRADEMARK OFFICE
CERTIFICATE OF CORRECTION

PATENT NO. : 6,309,551 B1
DATED : October 30, 2001
INVENTOR(S) : Ronald J. Suchecki, Jr. et al.

It is certified that error appears in the above-identified patent and that said Letters Patent is hereby corrected as shown below:

<u>Column 8,</u>
Lines 19-20, delete "performing an action selected from";
Line 44; "." should read -- , --;
Line 54, "agent supplier" should read -- method --.

Signed and Sealed this

Eighteenth Day of June, 2002

*Attest:*

*Attesting Officer*

JAMES E. ROGAN
*Director of the United States Patent and Trademark Office*